United States Patent

Hirayama

[11] Patent Number: 6,064,765
[45] Date of Patent: May 16, 2000

[54] HANDWRITTEN INFORMATION INPUT APPARATUS

[75] Inventor: Tomoshi Hirayama, Tokyo, Japan

[73] Assignee: Sony Corporation, Tokyo, Japan

[21] Appl. No.: 08/229,058

[22] Filed: Apr. 18, 1994

Related U.S. Application Data

[63] Continuation of application No. 07/824,207, Jan. 22, 1992, abandoned.

[30] Foreign Application Priority Data

Jan. 22, 1991 [JP] Japan ...................................... 3-22803

[51] Int. Cl.$^7$ ...................................................... G06K 9/00
[52] U.S. Cl. ............................................................. 382/189
[58] Field of Search .................................. 382/13, 57, 59, 382/187, 189; 345/121, 179, 180, 182

[56] References Cited

U.S. PATENT DOCUMENTS

| | | | |
|---|---|---|---|
| 4,672,677 | 6/1987 | Yamakawa | 382/59 |
| 4,727,588 | 2/1988 | Fox et al. | 382/13 |
| 4,839,634 | 6/1989 | More et al. | 345/173 |
| 4,860,372 | 8/1989 | Kuzunuki et al. | 340/708 |
| 4,953,225 | 8/1990 | Togawa et al. | 382/59 |
| 4,972,496 | 11/1990 | Sklarew | 382/13 |

FOREIGN PATENT DOCUMENTS

| | | |
|---|---|---|
| 0 254 561 | 1/1988 | European Pat. Off. . |
| 0 379 336 | 7/1990 | European Pat. Off. . |
| 36 29 104 | 3/1987 | Germany . |

*Primary Examiner*—Christopher S. Kelley
*Attorney, Agent, or Firm*—Hill & Simpson

[57] ABSTRACT

A handwritten information input apparatus comprising a pen for inputting character information by handwriting; a tablet traceable by the pen and adapted for detection of the trace information inputted by the pen; a display unit provided under the tablet for displaying an image visibly through the tablet; a first area defined on the tablet for inputting the trace information by the pen; a second area defined on the display unit for displaying characters generated by pattern recognition of the trace information written in the first area; and a controller for displaying a desired character in the first area on the display unit when the pen is dragged on a portion of the tablet corresponding to the desired character displayed in the second area. The apparatus is capable of deleting, inserting and correcting handwritten characters by mutually similar manipulations.

10 Claims, 17 Drawing Sheets

HANDWRITTEN INFORMATION INPUT APPARATUS

This is a continuation of application Ser. No. 824,207, filed Jan. 22, 1992 now abandoned.

BACKGROUND OF THE INVENTION

1. Field of the Invention

The present invention relates to a handwritten information input apparatus adapted for use in an electronic notebook or the like where characters can be inputted by handwriting with a pen on a specific plate.

2. Description of the Prior Art

FIG. 17 shows an exemplary constitution of a conventional handwritten information input apparatus known heretofore. This apparatus basically consists of an LCD (liquid crystal display) unit and a tablet disposed thereon, wherein a locus traced by a pen is detected from the tablet and, after the locus thus detected is identified by pattern recognition, the character obtained as a result of such recognition is displayed on the LCD unit. More specifically, when a character is inputted by handwriting with an unshown pen in a square 103a on a letter plate 103, the character is identified by pattern recognition and then is displayed in the square 103a. If a write button 102c is touched with the pen when a proper character has been obtained by such pattern recognition, the character in the square 103a is then displayed on a page plate 101. Such display is performed at the position of a cursor 104.

FIG. 17A illustrates an example where characters "BLACK" are displayed on the page plate 101. Suppose now that, in this state, a desired character (character row) is to be deleted. First the pen is brought into touch with a delete button 102b and then is dragged on the character row to be deleted ("LAC" in this example), whereby the character row is displayed with a reversed image as shown in FIG. 17B. After the pen is dragged from one desired character to another desired character, the pen is released upward from the page plate 101, so that the character row is deleted as shown in FIG. 17C.

Now a description will be given on an operation of partially replacing the characters, which are being displayed on the page plate 101, with other characters. In this case, first the character row to be replaced is deleted as mentioned above. After completion of the deletion, a handwrite button 102a is touched with the pen to switch the operation to a character handwrite mode. As shown in FIG. 17C, the cursor 104 is left positionally unchanged despite deletion of the character row. When another character is to be inserted between the characters "B" and "K" in this state, the cursor 104 is shifted to the position between "B" and "K". (FIG. 18A) This shift is realized by touching the space between "B" and "K" with the pen. Subsequently, as shown in FIG. 18B, characters to be inserted (e.g., "A" and "N") are written in the squares 103 on the letter plate 103. And if the write button 102c is touched with the pen when the characters "A" and "N" have been displayed after being correctly identified by pattern recognition, the characters "A" and "N" are inserted at the position of the cursor 104 as shown in FIG. 18C.

In the conventional handwritten information input apparatus, as described above, individually different manipulations are necessary to perform deletion, insertion and correction of characters to eventually raise a problem of low operational efficiency.

OBJECT AND SUMMARY OF THE INVENTION

It is an object of the present invention to provide an improved handwritten information input apparatus which is capable of deleting, inserting and correcting handwritten characters by mutually similar manipulations.

According to one aspect of the present invention, there is provided a handwritten information input apparatus having a first area traced when characters are written, a second area for displaying the characters written in the first area and decided, and a pen manipulated for writing characters. The apparatus further includes a control means for displaying the character row in the first area when the pen is dragged on the character row displayed in the second area. In this apparatus, a character row in the second area is displayed, in response to a drag of the pen thereon, in the first area. Consequently the deletion, insertion and correction of characters can be performed by similar manipulations.

According to another aspect of the present invention, there is provided a handwritten information input apparatus having a first area traced when characters are written, a second area for displaying the characters written in the first area and decided, a pen manipulated for writing characters, and a write button manipulated when the characters written in the first area are to be displayed in the second region. The apparatus further includes a control means for selecting an editing mode when the pen is dragged on the characters displayed in the second area, and interrupting the editing mode when the write button is touched by the pen in the editing mode. Thus, the operation is switched to the editing mode in response to a drag of the pen on the character row displayed in the second area, and the editing mode is interrupted in response to a touch of the write button with the pen. Therefore the necessity of additionally providing an edit button can be eliminated to eventually enhance the operational efficiency.

And according to a further aspect of the present invention, there is provided a handwritten information input apparatus having a first area traced when characters are written, a second area for displaying the characters written in the first area and decided, a pen manipulated for writing characters, and a cursor display control circuit for displaying a cursor at the position where the character written in the first area is to be written in the second area. In this apparatus, the cursor is shifted to the position of a drag of the pen. Consequently it becomes possible to distinguish between the drag on the characters and the drag on the cursor without the necessity of additionally providing an edit button in particular, thereby enhancing the operational efficiency.

The above and other features and advantages of the present invention will become apparent from the following description which will be given with reference to the illustrative accompanying drawings.

DESCRIPTION OF THE PREFERRED EMBODIMENT

Figure 1:
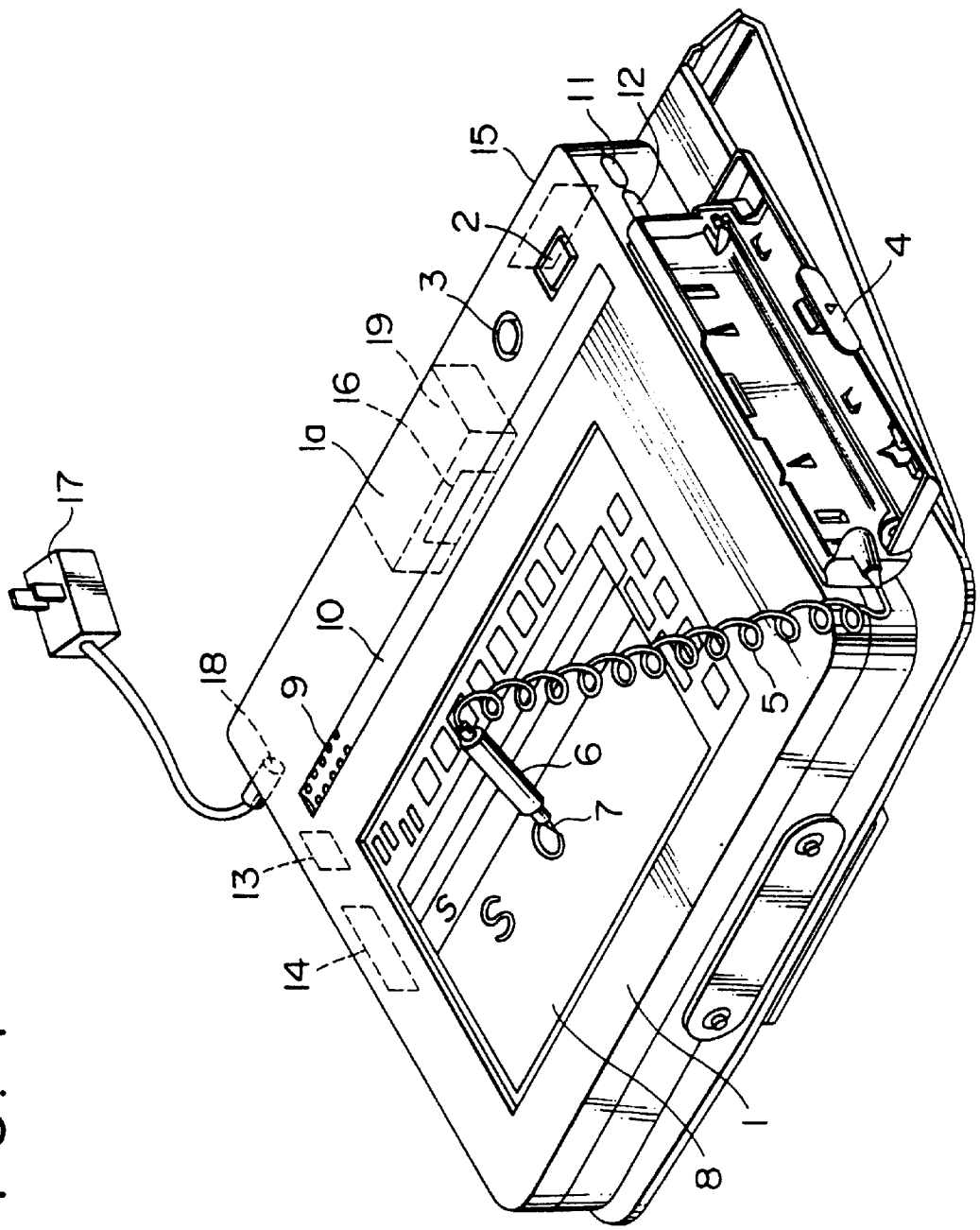
FIG. 1 is a perspective view of an exemplary embodiment with the handwritten information input apparatus of the present invention applied to a portable computer.

FIG. 1 is a perspective view of a preferred embodiment which represents an example of applying the handwritten information input apparatus of the present invention to an electronic notebook (portable computer). A main body 1 is equipped with a power switch 2 which is turned on when using the apparatus or is turned off for halting the use. Adjacent to the left of the power switch 2, there is provided a luminance adjust switch 3 for adjusting the luminance of a display screen 8 (luminance of an undermentioned LCD unit 22). A case 4 is disposed on one side of the main body 1. In the case 4 is housed, when not in use, a pen 6 having a switch 7 at the fore end and connected via a cord 5 to the main body 1. The pen 6 is so contrived, when taken out of the case 4, as to be placeable in a groove 10 formed horizontally in an upper portion of the main body 1. And at the left of the groove 10, there is disposed a speaker 9 for outputting a predetermined sound.

Two switches 11, 12 are provided in an upper portion on the right side of the main body 1. The switch 11 is used for selectively changing the luminance intensity of an undermentioned back light in two steps for example, and the switch 12 is used for selectively changing, in three steps for example, the volume of the sound outputted from the speaker 9. Another switch 13 provided on the left side of the main body 1 is actuated for interrupting a predetermined operation (e.g., for interrupting the sound being emitted). Also on the left side of the main body 1, there is disposed a socket 14 where a memory IC card 70 (FIG. 5) is loaded. And a socket 15 is provided in a rear portion of the main body 1. Furthermore, another socket 16 is provided in a battery compartment 1a formed in a rear portion of the main body 1 for housing a battery 19. The sockets 15, 16 are so arranged that a cable (e.g. RS232C), a modem, an adaptor and so forth are connectable thereto. And a connection terminal 18 for an AC adaptor 17 is provided in an upper portion on the left side of the main body 1.

Figure 2:
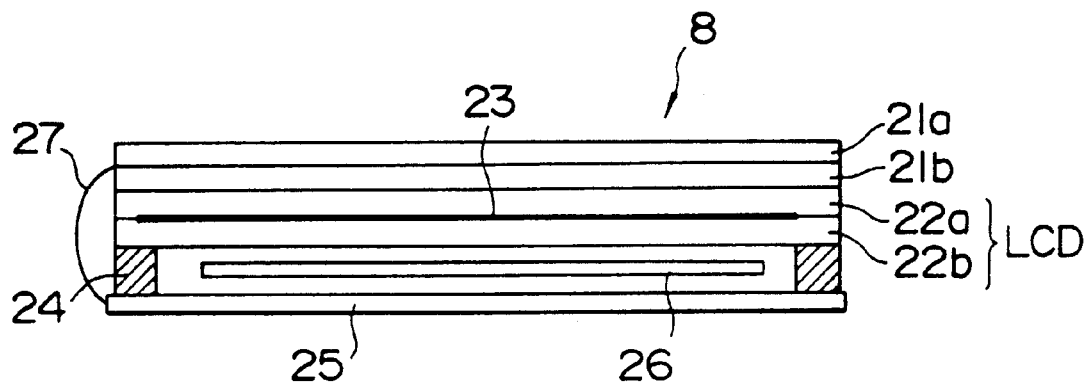
FIG. 2 is a sectional view showing the structure of an input screen in the embodiment of FIG. 1.

FIG. 2 illustrates an exemplary structure of the display screen 8 in detail. In this embodiment, a tablet 21 (consisting of a tablet 21a for detection of an X-axis position and a tablet 21b for detection of a Y-axis position) is diposed at the top, and an LCD (liquid crystal display) unit 22 is positioned under the tablet 21. The LCD unit 22 consists of upper and lower glass sheets 22a, 22b and a liquid crystal 23 inserted therebetween. And a fluorescent EL plate 26 is disposed under the LCD unit 22. When light is emitted from the fluorescent EL plate 26 serving as a back light, the output light illuminates the LCD unit 22. Since the tablets 21a, 21b are both composed of a transparent material, an image displayed by the liquid crystal 23 can be observed from above in the drawing. Unshown component elements are mounted on a printed circuit board (PCB) 25, which is electrically connected to the LCD unit 22 via a rubber connector 24 while being electrically connected also to the tablet 21 through a conductive film 27.

Figure 3:
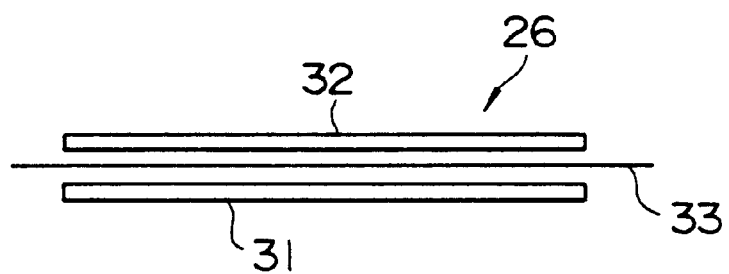
FIG. 3 is a sectional view of an exemplary fluorescent EL plate employed in FIG. 2.

FIG. 3 shows a detailed structure of the fluorescent EL plate 26. In this embodiment, an insulator film 33 is interposed between an electrode 31 and a light emitter (another electrode) 32, so that when a predetermined voltage is applied between the electrode 31 and the light emitter 32, a light output is produced from the energized emitter 32. Each of the electrode 31 and the light emitter 32 is shaped into a plate so as to be capable of illuminating the screen 8 uniformly.

The back light may be composed of a suitable fluorescent tube as a side light on one side of the main body for illuminating the screen by transmission of a light output therefrom to a rear portion of the LCD unit 22 through a light transmitting member.

Figure 4:
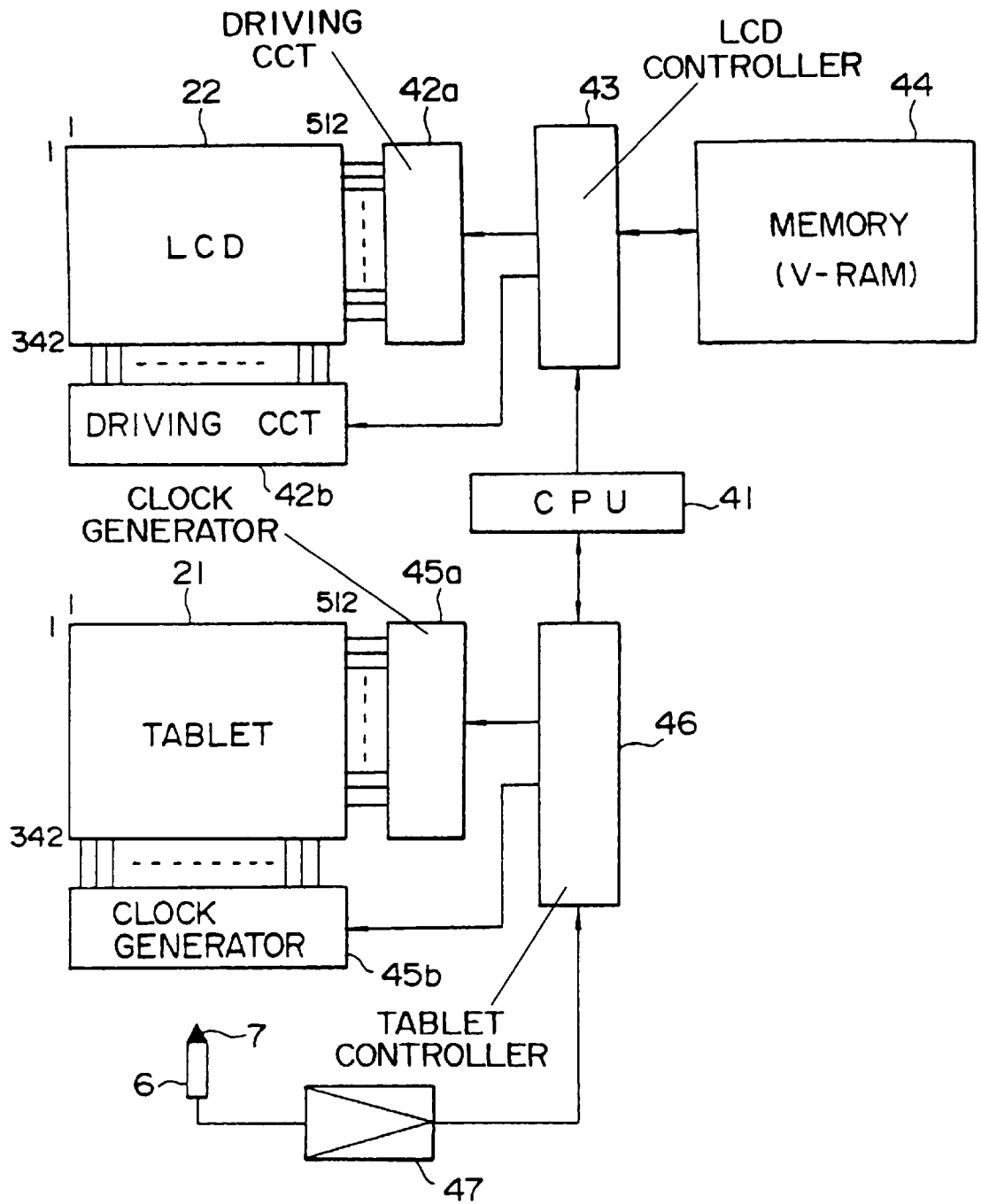
FIG. 4 is a block diagram showing the relationship of electrical connection between an LCD unit and a tablet in FIG. 1.

FIG. 4 is a circuit diagram showing the principle of positional detection executed by the tablet and that of display by the LCD unit. The tablet 21 has, e.g., 512 electrodes in the X-axis direction and 342 electrodes in the Y-axis direction to realize detection of 512×342 pixels. A tablet controller 46 controls a clock generator 45a so that a predetermined voltage is applied sequentially to each of the 342 electrodes. Subsequently another clock generator 45b is controlled, and a predetermined voltage is applied sequentially to each of the 512 electrodes. Consequently, the tablets 21 are scanned by clock signals obtained from the clock generators 45a and 45b. With an approach of the pen 6 to a desired position on the table 21, a predetermined electrostatic capacity is formed between the tablet 21 and the pen 6. And when the pen 6 is depressed to the tablet 21, the switch 7 disposed at the fore end of the pen 6 is turned on to thereby detect the static charge generated between the pen 6 and the relevant electrode on the tablet 21, and the detected charge is supplied via an amplifier 47 to the tablet controller 46. Since the tablet controller 46 functions to control the timing to generate clock signals from the clock generators 45a and 45b, it is possible to detect the position depressed by the pen 6 on the tablet 21 in accordance with both the detection signal supplied from the pen 6 and the clock signal generation timing. Thereafter the tablet controller 46 supplies to a CPU 41 the operational coordinates thus detected by the pen 6.

The CPU 41 controls an LCD controller 43 and writes data, which correspond to an image to be displayed, in a memory (V-RAM) 44. The LCD controller 43 reads the data from the memory 44 and supplies to a driving circuit 42b a signal corresponding to the data. The LCD unit 22 has 512 horizontal electrodes and 342 vertical electrodes correspondingly to the tablet 21. And the driving circuit 42a serves to apply a predetermined voltage sequentially to each of the 342 electrodes. Meanwhile the driving circuit 42*b* serves to apply a predetermined voltage sequentially to each of the 512 electrodes. Thus the individual pixels on the LCD unit 22 are scanned, and a desired image is displayed on the LCD unit 22.

Figure 5:
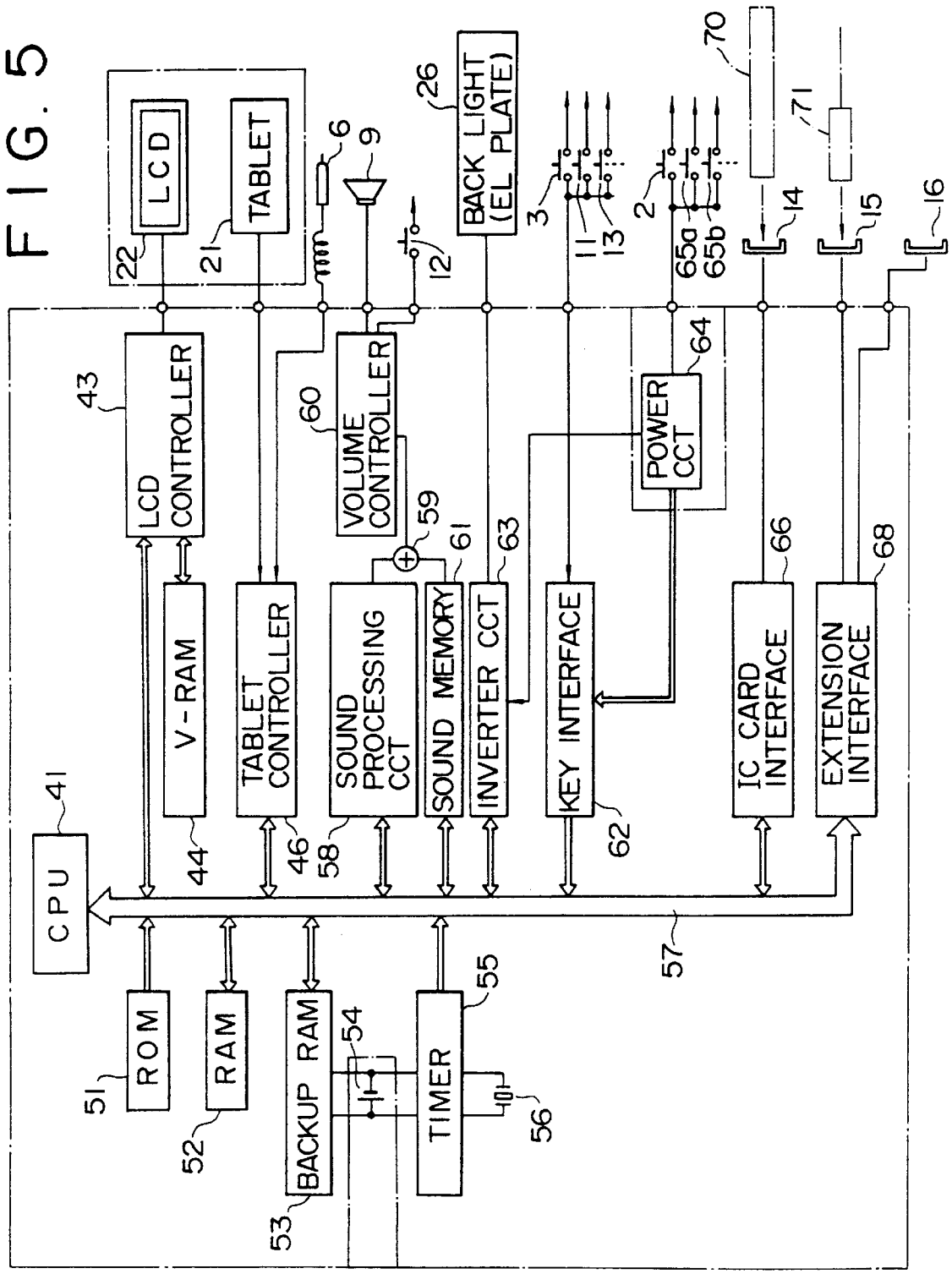
FIG. 5 is a block diagram showing the entire electrical constitution in the embodiment of FIG. 1.

FIG. 5 shows a further detailed electric constitution in the main body 1. The CPU 41 is connected to various ICs and so forth via a bus line 57. In a ROM 51, there are stored a system program for the entire apparatus, a kana-kanji character conversion program for a word processing function, a dictionary table therefor, a recognition program for a manual write input, a dictionary table therefor and so forth. In a working RAM 52 is stored, when necessary, data needed for the operation. A backup battery 54 (different from the aforementioned battery 19) is connected to a backup RAM 53 so that the required data can be backed up even in case the power supply for the main body of the apparatus is accidentally turned off. A timer IC 55 is connected to the backup battery 54 and counts clock pulses obtained from a quartz vibrator 56, thereby outputting the data of a date and a time at the counting instant. The LCD controller 43 and the tablet controller 46 mentioned above are also connected to the CPU 41 via the bus line 57.

A sound processing circuit 58 generates a predetermined sound signal in response to an input command from any of the sockets 14 through 16 or the CPU 41 and transmits such sound signal to an adder 59. A sound memory 61 is controlled by the CPU 41 and transmits a stored sound (e.g. a warning sound "eh ?") to the adder 59. Then the adder 59 adds the output of the sound processing circuit 58 to the output of the sound memory 61, and transmits the result of such addition to the speaker 9 via a sound volume controller 60. The sound volume can be controlled by actuating a sound select switch 12 connected to the sound controller 60.

The output power of a power circuit 64 (obtained from either the battery 19 or the AC adaptor 17 when the power switch 2 is turned on) is supplied to the fluorescent EL plate (back light) 26 via an inverter circuit 63. The luminous intensity of the fluorescent EL plate 26 can be changed in two steps (e.g., to a value suited for a light room or to another value suited for a dark room) by selectively changing the switch 11. In addition, the luminous intensity of the LCD unit 22 can be controlled to a desired value by controlling the luminance adjust switch 3 separately from the above procedure. A switch 65*a* is turned on or off in accordance with whether the battery is loaded in the main body 1 is a primary battery or a secondary one. Meanwhile a switch 65*b* is turned on or off in accordance with the detected capacity of the battery 19. The switches 65*a* and 65*b* are connected to a key interface 62 via the power circuit 64. To the key interface 62, there are also connected the aforementioned luminance adjust switch 3, select switch 11 and halt switch 13. The key interface 62 supplies to the CPU 41 a signal corresponding to each on-off action of these switches.

An IC card 70 is connected to the socket 14 so that the CPU 41 is capable of transferring any data and program to or from the IC card 70 via an IC card interface 66. An adaptor 71 is connected to the sockets 15 and 16 in a manner to be further connected to the CPU 41 via an extension interface 68.

Figure 6:
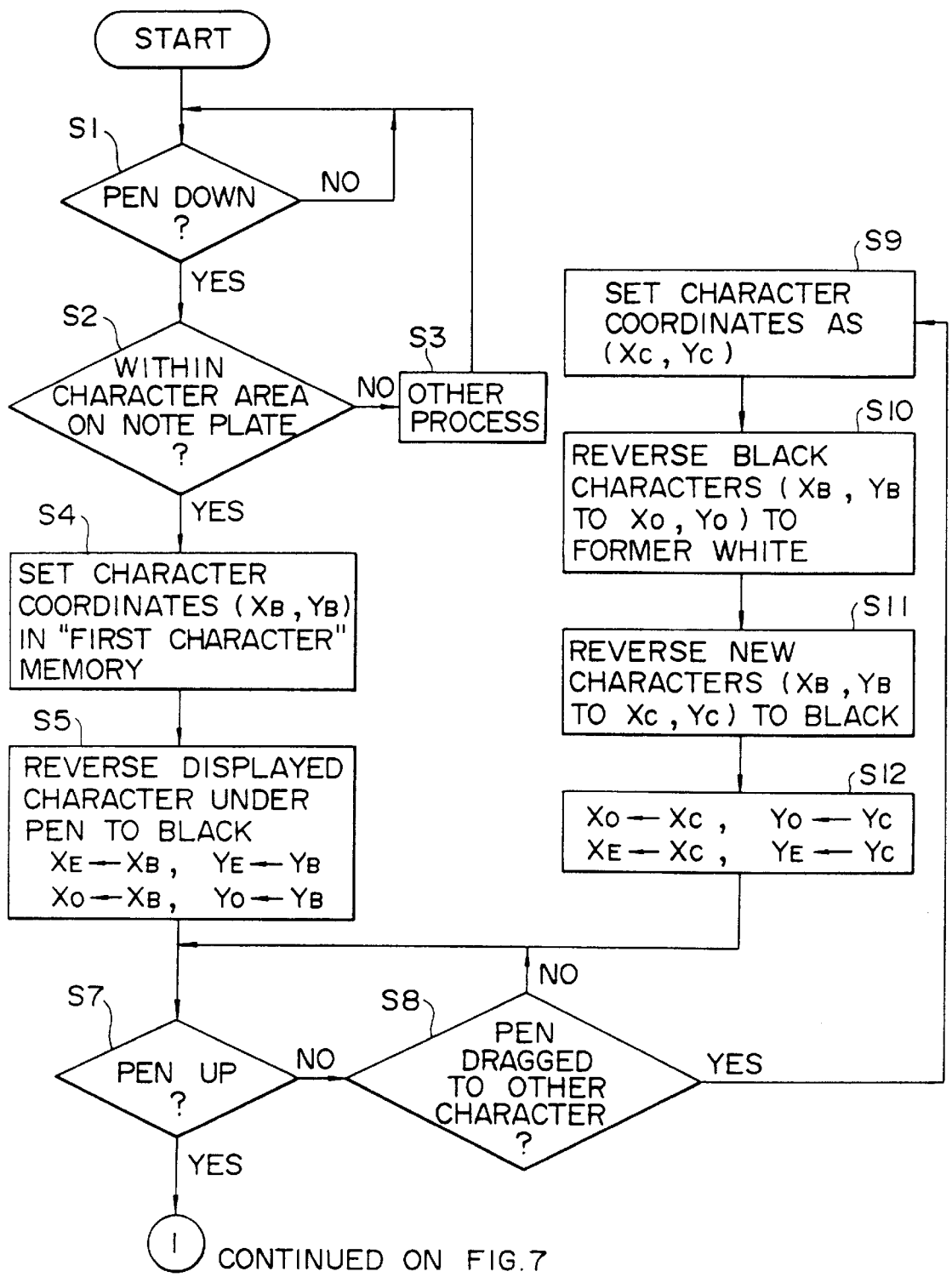
FIG. 6 is a flow chart of the operation performed in the embodiment of FIG. 5.
Figure 7:
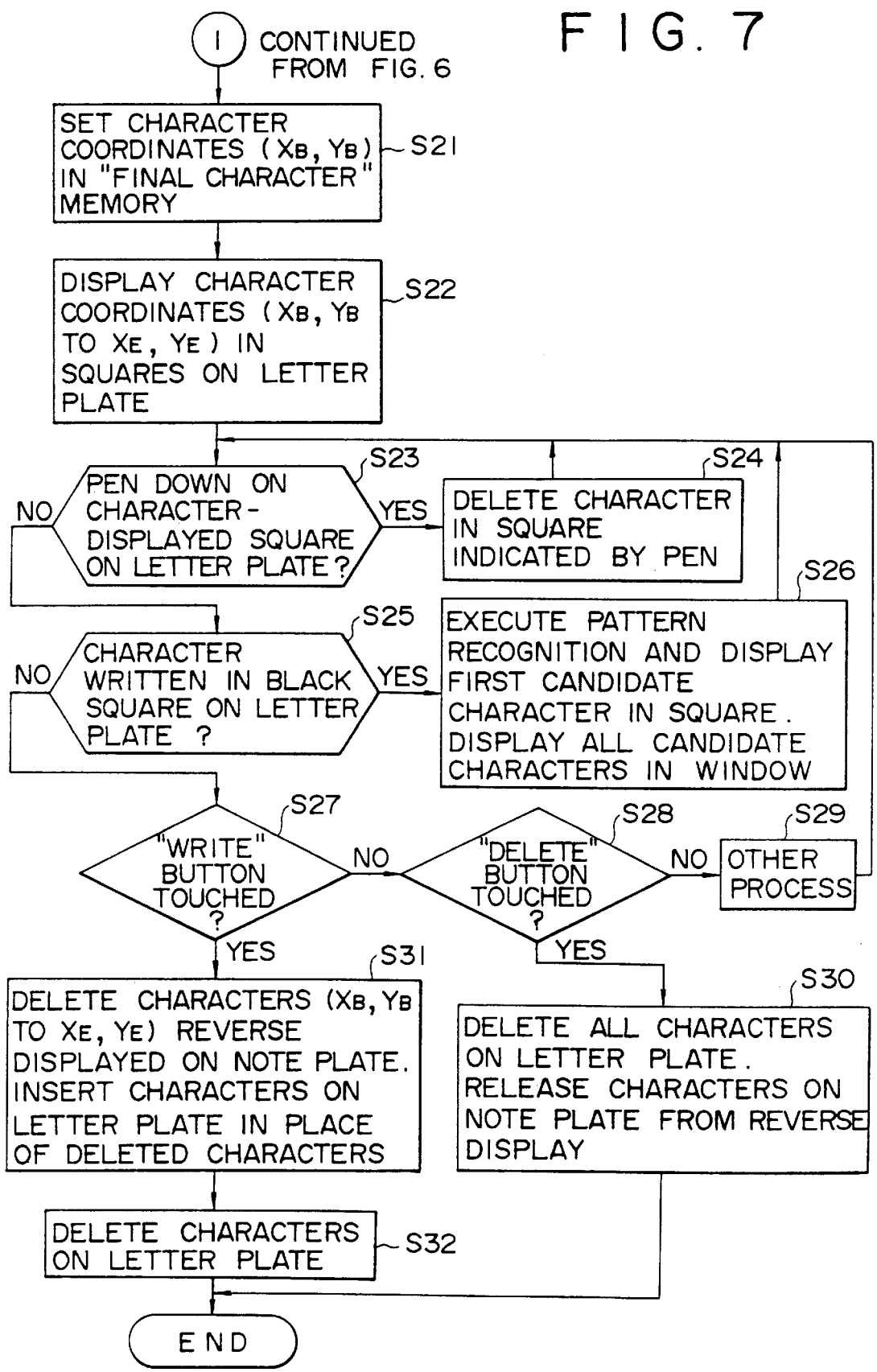
FIG. 7 is another flow chart of the operation performed in the embodiment of FIG. 5.
Figure 8:
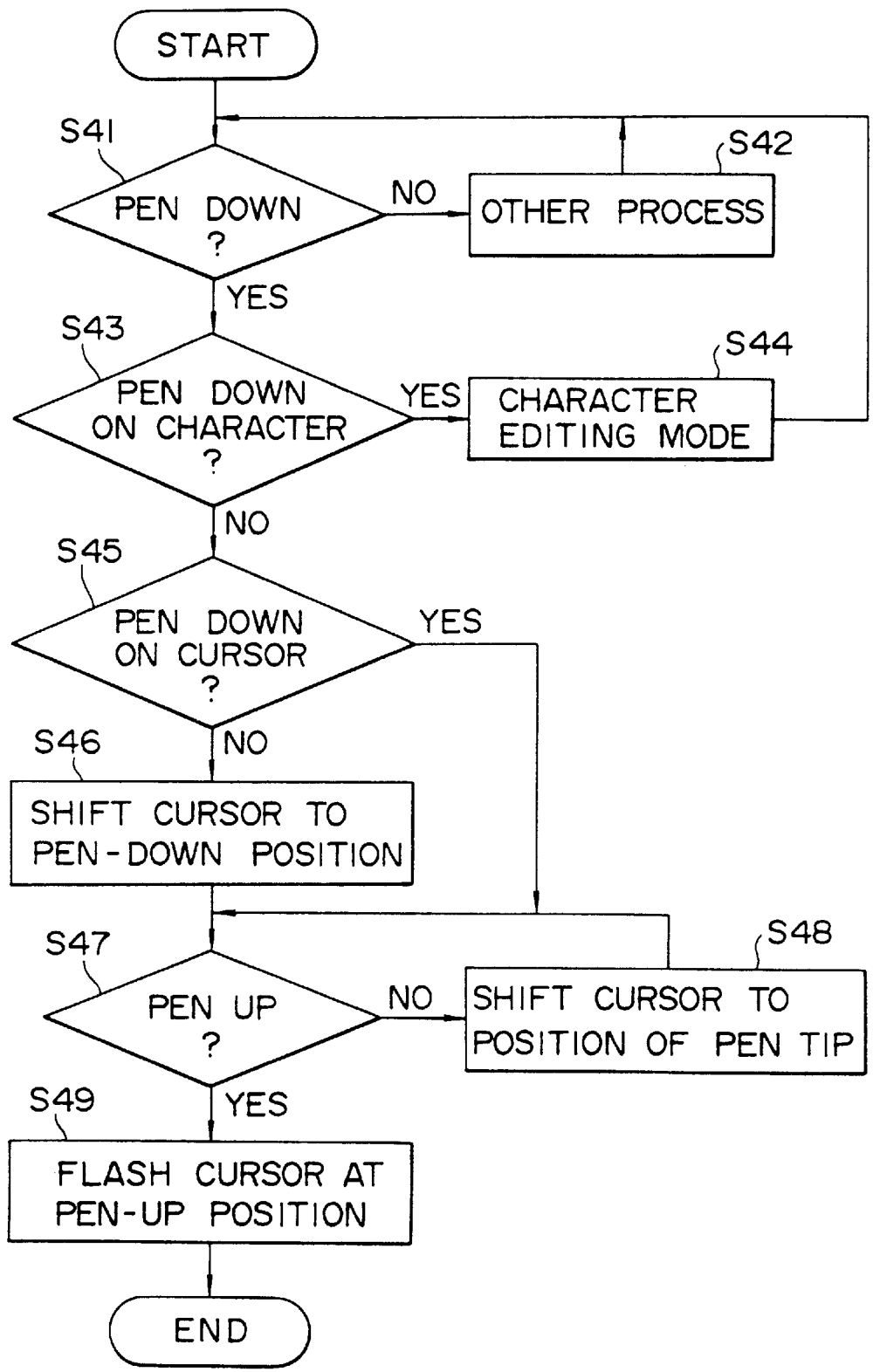
FIG. 8 is a further flow chart of the operation performed in the embodiment of FIG. 5.

Hereinafter the operation for editing characters inputted by handwriting with the pen 6 on the screen 8 will be described with reference to flow charts of FIGS. 6 through 8.

First a decision is made in step S1 as to whether a pen-down action has been performed or not. Turn-on of the switch 7 disposed at the fore end of the pen 6 is regarded as a pen-down action, and turn-off of such switch 7 is regarded as a pen-up action. Upon detection of the pen-down action, a decision is made in step S2 as to whether the pen-down position is within the character display area on the note plate 81 (FIG. 9) of the screen 8. Even with the pen-down action, if the position thereof is outside the character display area, the other process is executed in step S3. In case the pen-down position is within the character display area, coordinates XB, YB of the character inputted by the pen-down action is set in a "first character" memory (step S4). Subsequently the character being displayed under the pen 6 is reversed to black. Then a variable XB is set in place of a variable XE, and a variable YB in place of a variable YE, respectively. In the same manner, a variable XB is set in place of a variable XO, and a variable YB in place of a variable YO, respectively. The variables XE, YE signify coordinates indicating the final drag position of the pen 6, and the variables XO, YO signify final coordinates of the character reversed to be black already.

If no pen-up action is performed after the preceding pen-down action (step S7), a decision is made in step S8 as to whether the pen 6 has been dragged on any other character. In case there is a drag of the pen from the character inputted by the pen-down action, the coordinates of the next character are set as XC, YC (step S9). And the reversed black characters (from XB, YB to XO, YO) are reversed again to former white (step S10). Subsequently in step S11, the characters from coordinates XB, YB to XC, YC are newly reversed to black. Then in step S12, a variable XC is set in place of XO, and a variable YC in place of YO, respectively. In the same manner, a variable XC is set in place of XE, and a variable YC in place of YE, respectively. After execution of such process, the operation reverts to step S7 where a decision is made as to whether a pen-up action has been performed or not.

Due to the procedure mentioned above, all the characters from the pen-down position to the current position of the pen 6 are displayed always in reversed black.

When the result of the decision in step S7 signifies the presence of a pen-up action, the operation proceeds to step S21 where the character coordinates XE, YE at the pen-up position are set in a "final character" memory. And in step S22, the characters from the coordinates XB, YB to XE, YE are displayed in the squares 83 (FIG. 9) on the letter plate 82.

Thus, when the pen 6 is dragged on any character displayed on the page plate 81, such character is displayed on the letter plate 82. And if a pen-down action is performed again to the character-displayed square 83 on the letter plate 82, the relevant character in the square 83 is deleted therefrom (steps S23 and S24). When a character is written with the pen 6 in any blank square 83 on the letter plate 82, pattern recognition is performed, and a first candidate character obtained as a result of such pattern recognition is displayed in the same square 83. In this stage, the entire candidate characters are displayed in a candidate character display window 87 (FIG. 9) (steps S25 and S26).

Subsequently a decision is made in step S27 as to whether a write button 85 (FIG. 9) has been touched or not with the pen 6. Upon touch of the write button 85, the characters (from the coordinates XB, YB to XE, YE) displayed in reversed black on the note plate 81 are deleted therefrom. And the other characters being displayed on the letter plate 82 are inserted in the positions of the deleted characters (step S31). In this stage, the characters that have been displayed on the letter plate 82 until then are deleted therefrom (step S32).

If the result of the decision in step S27 signifies the absence of a touch of the write button 85 with the pen 6, the operation proceeds to step S28 where a decision is made as to whether the delete button 86 has been touched or not. And if the result of such decision signifies the absence of a touch of the delete button 86, the operation proceeds to step S29 for execution of the other process and then reverts to step S23. In case the result of the decision signifies the presence of a touch of the delete button 86, the entire characters on the letter plate 82 are deleted therefrom, and the characters on the note plate 81 are released from the reversed display state (step S30).

Referring now to FIGS. 9 through 16, the above operation will be described in further detail on the basis of practical display contents on the screen.

Figure 9:
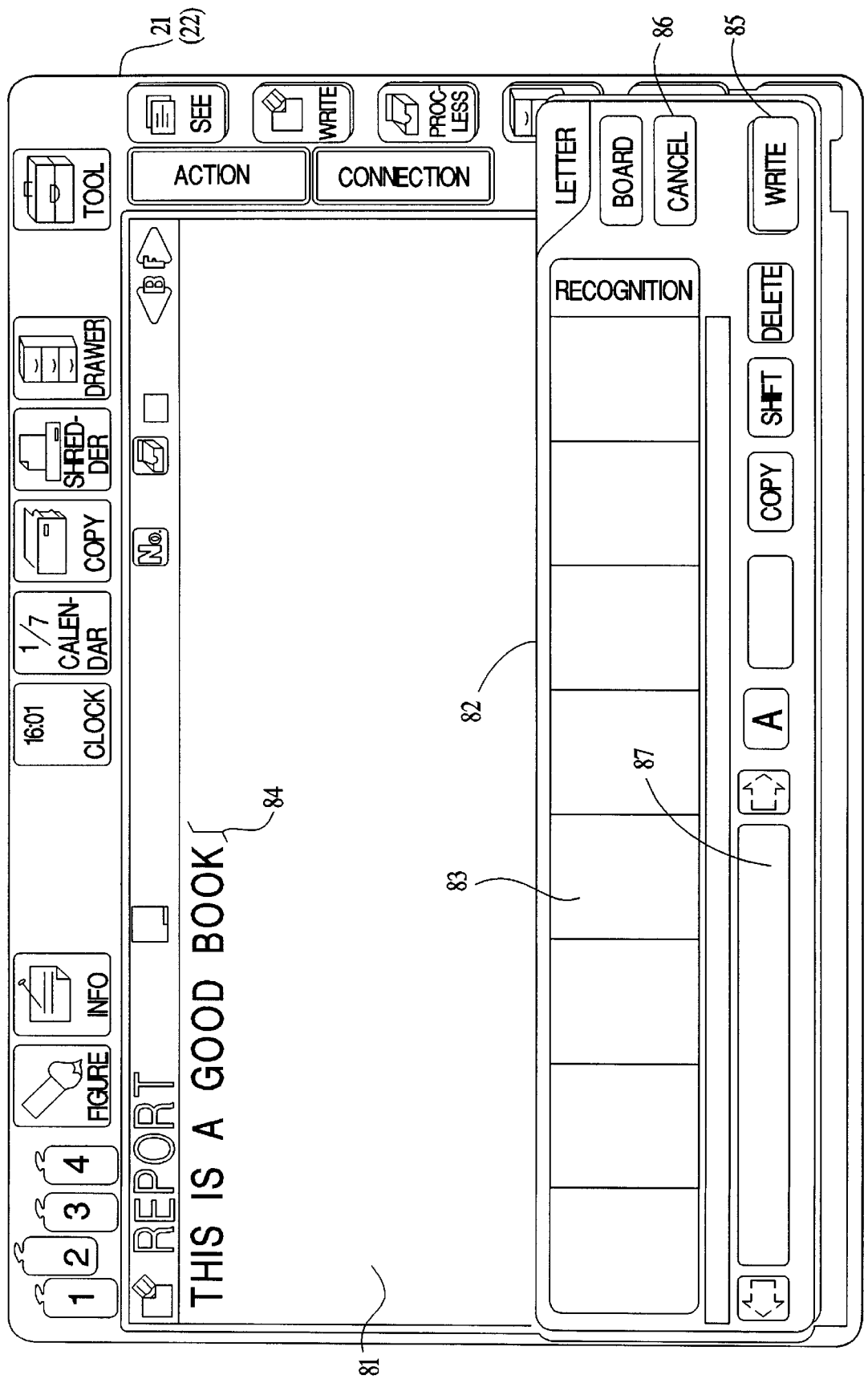
FIG. 9 illustrates exemplary display contents on the screen to explain the operation in the embodiment of FIG. 5.

In FIG. 9, characters "THIS IS A GOOD BOOK" are displayed on the note plate 81 (second area), and the cursor 84 is displayed in an end portion thereof. And the letter plate 82 (first area) having eight squares 83, a write button 85, a delete button 86 and a candidate character display window 87 is displayed on the note plate 81. In this example, nothing is displayed now in the squares 83 and the candidate character display window 87.

Figure 10:
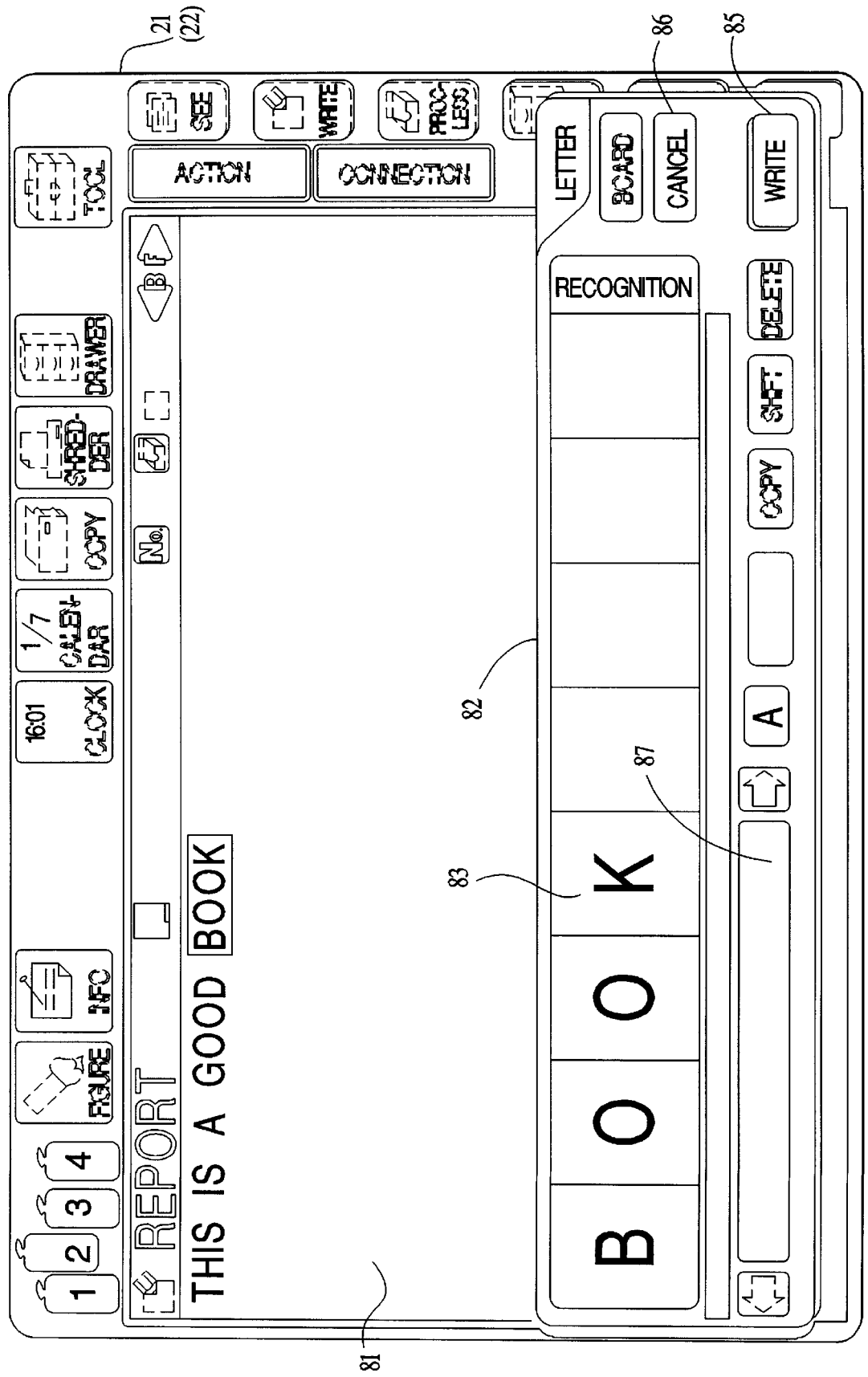
FIG. 10 illustrates exemplary display contents on the screen to explain the operation in the embodiment of FIG. 5.
Figure 11:
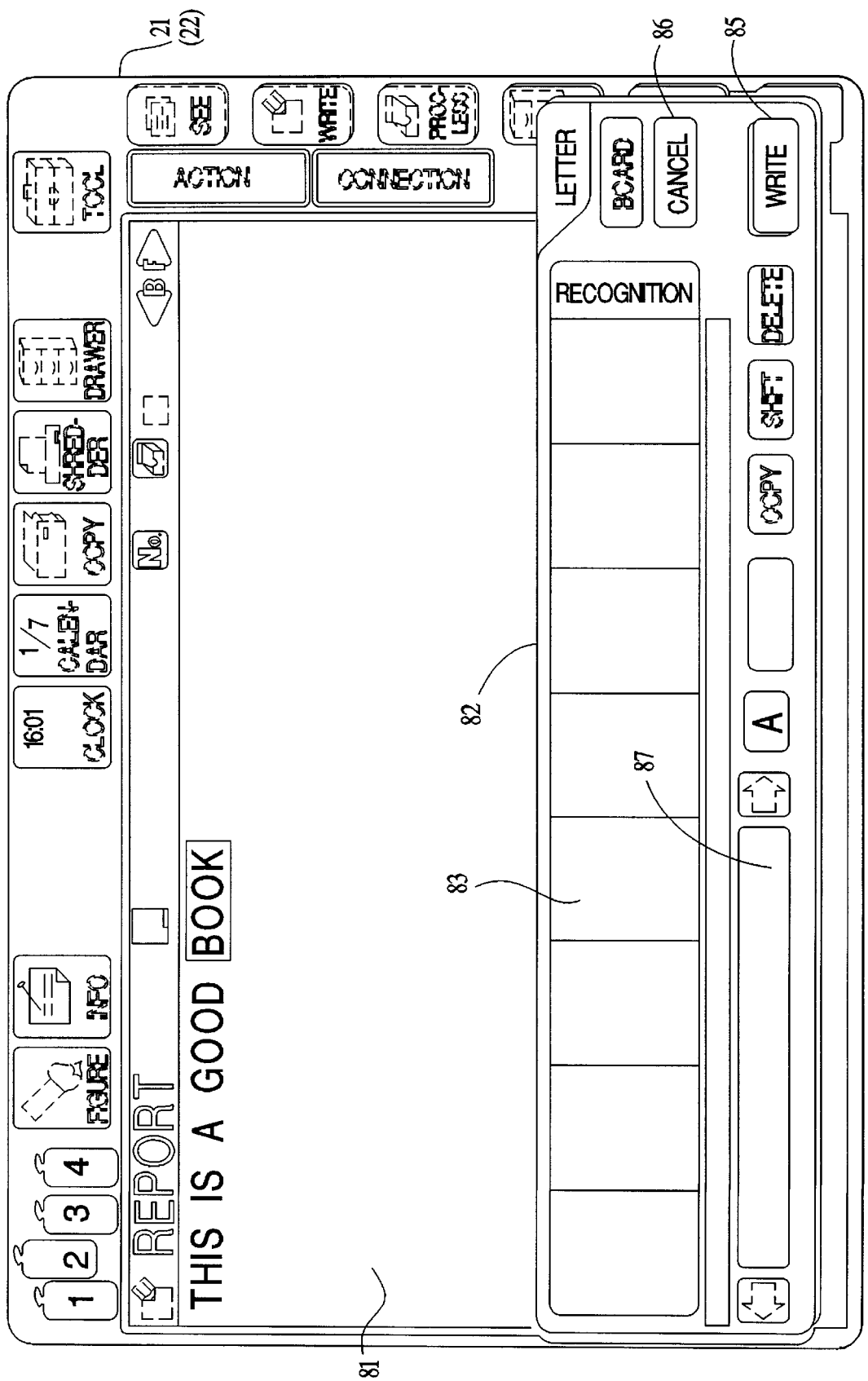
FIG. 11 illustrates exemplary display contents on the screen to explain the operation in the embodiment of FIG. 5.
Figure 12:
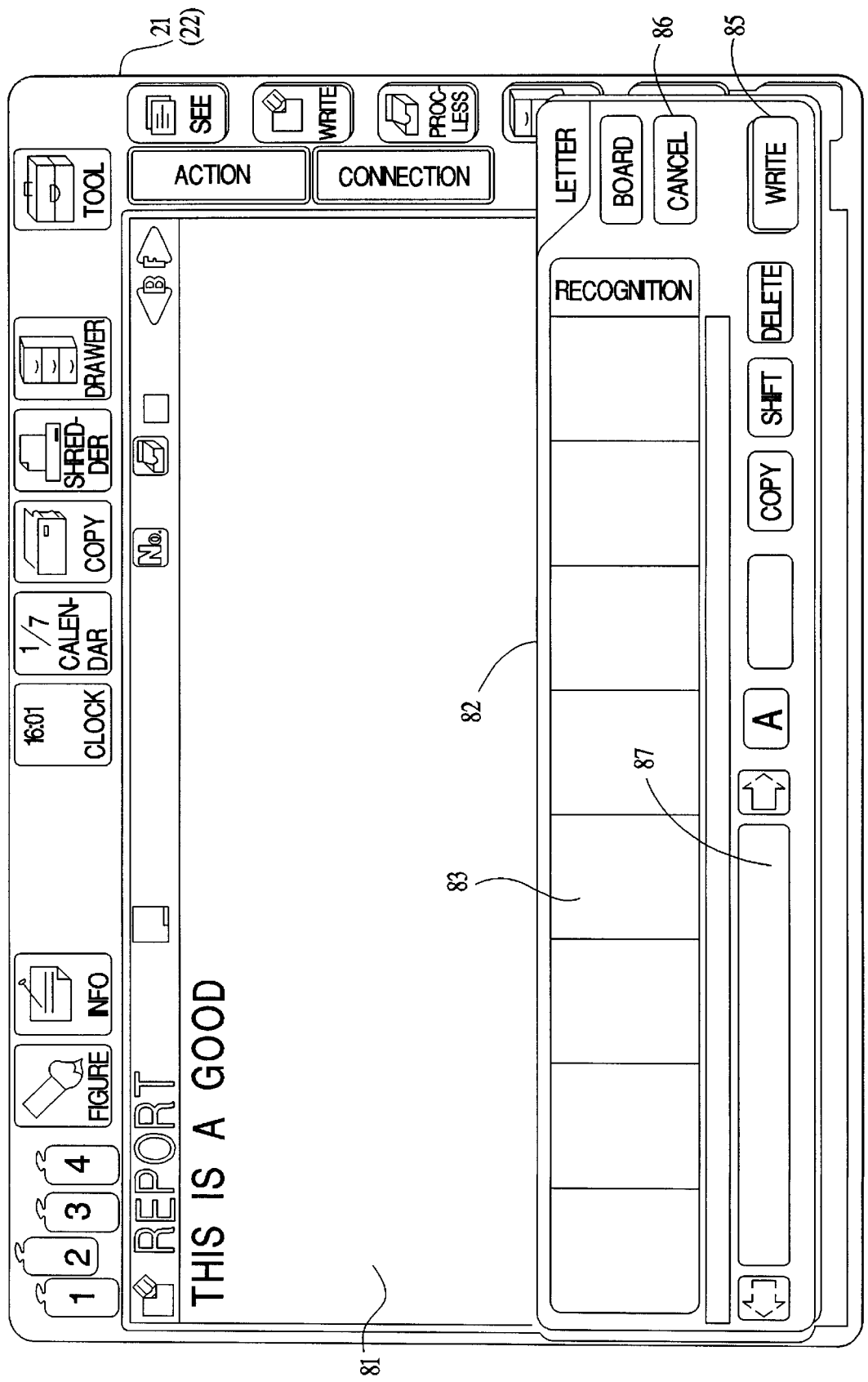
FIG. 12 illustrates exemplary display contents on the screen to explain the operation in the embodiment of FIG. 5.
Figure 13:
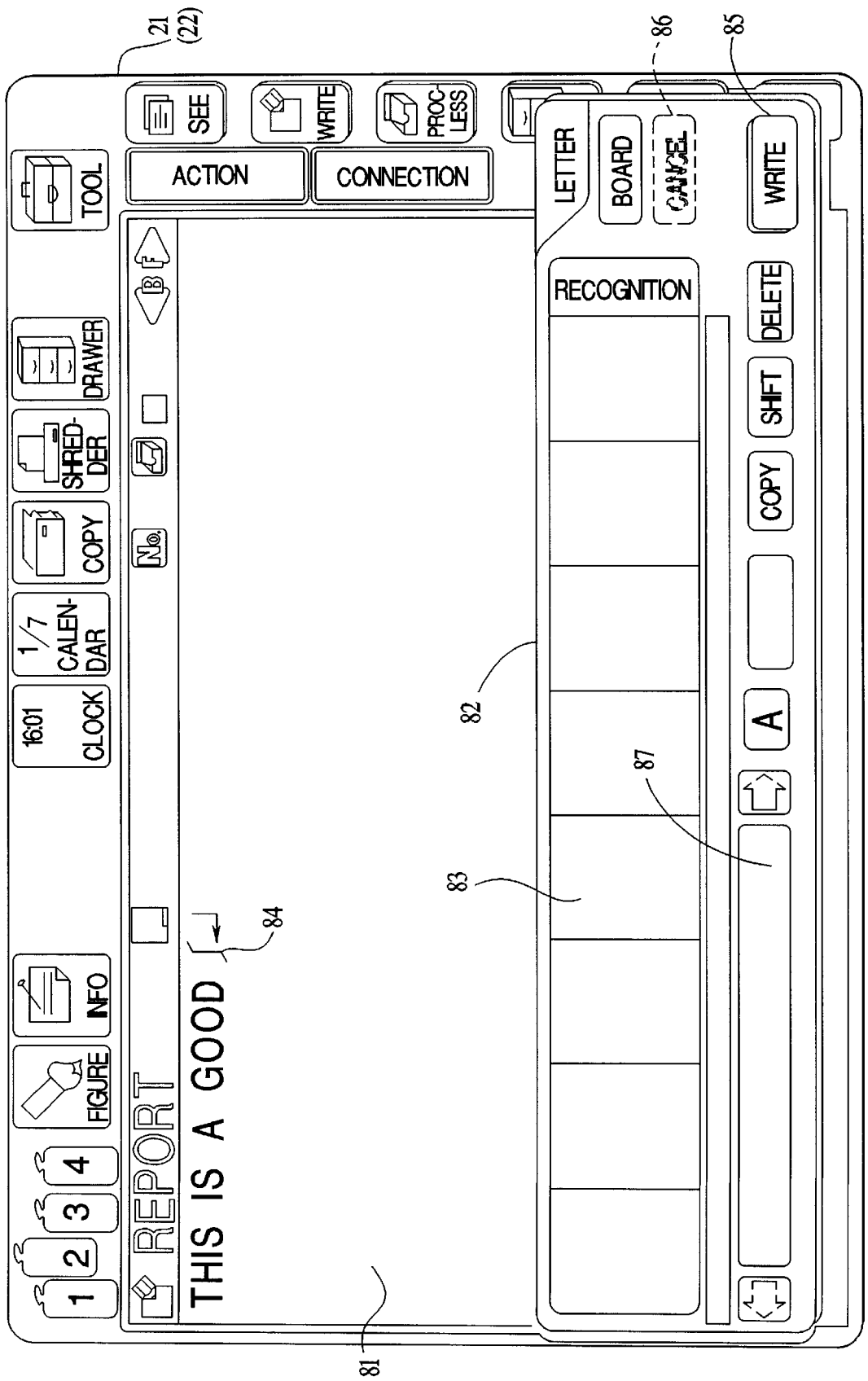
FIG. 13 illustrates exemplary display contents on the screen to explain the operation in the embodiment of FIG. 5.
Figure 14:
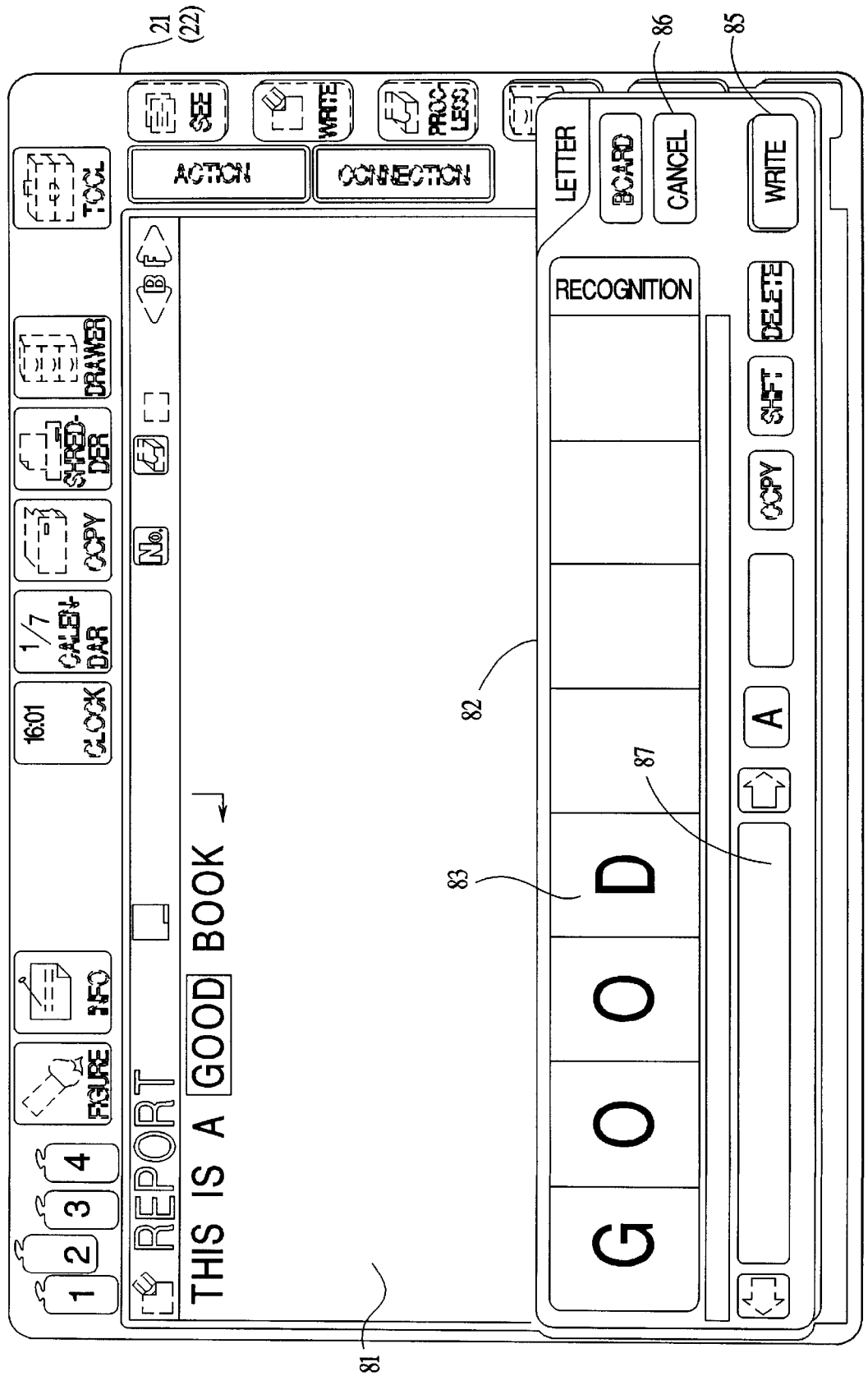
FIG. 14 illustrates exemplary display contents on the screen to explain the operation in the embodiment of FIG. 5.
Figure 15:
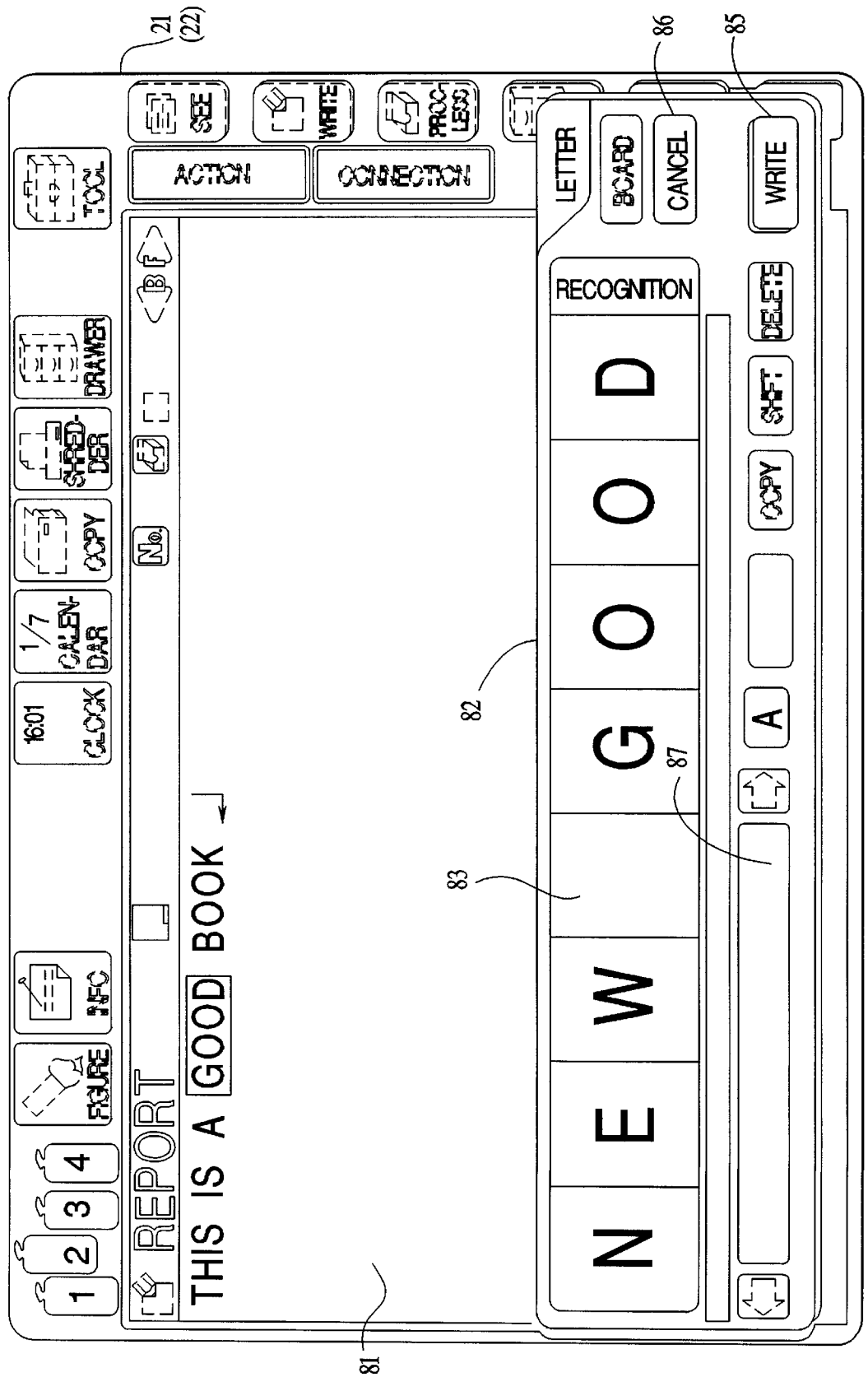
FIG. 15 illustrates exemplary display contents on the screen to explain the operation in the embodiment of FIG. 5.
Figure 16:
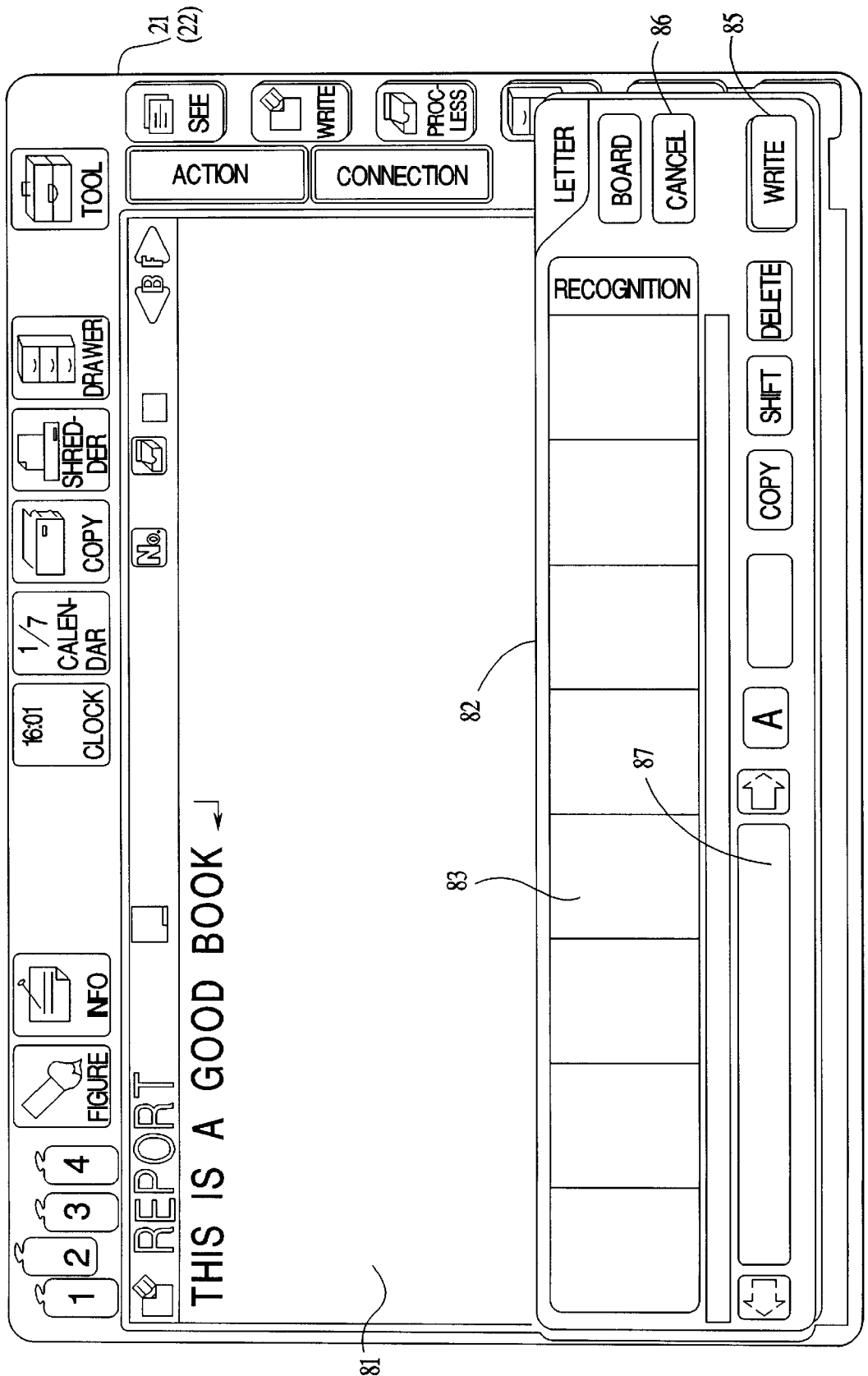
FIG. 16 illustrates exemplary display contents on the screen to explain the operation in the embodiment of FIG. 5.
Figure 17A:
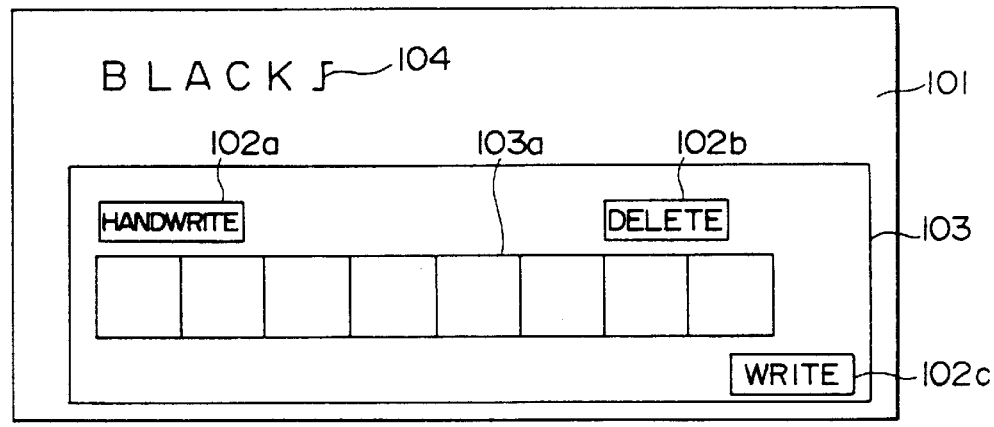
FIGS. 17A–17C illustrate exemplary display contents on the screen to explain a known operation for deletion of characters.
Figure 17B:
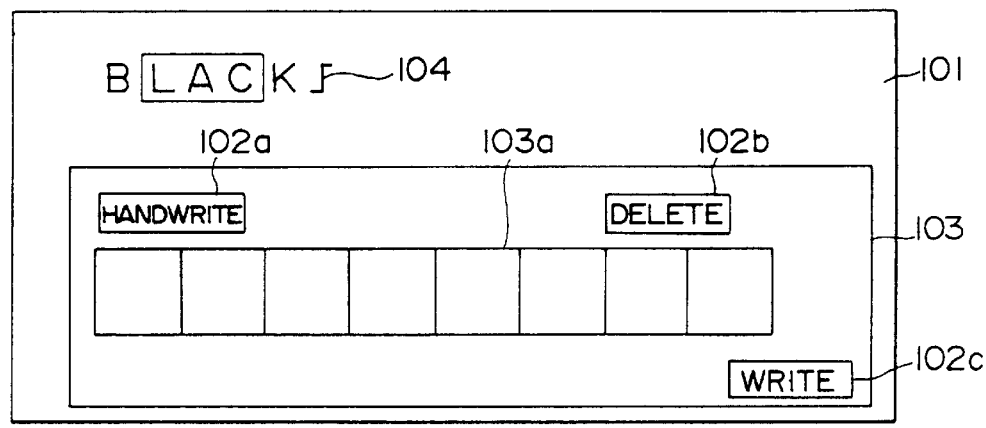
Figure 17C:
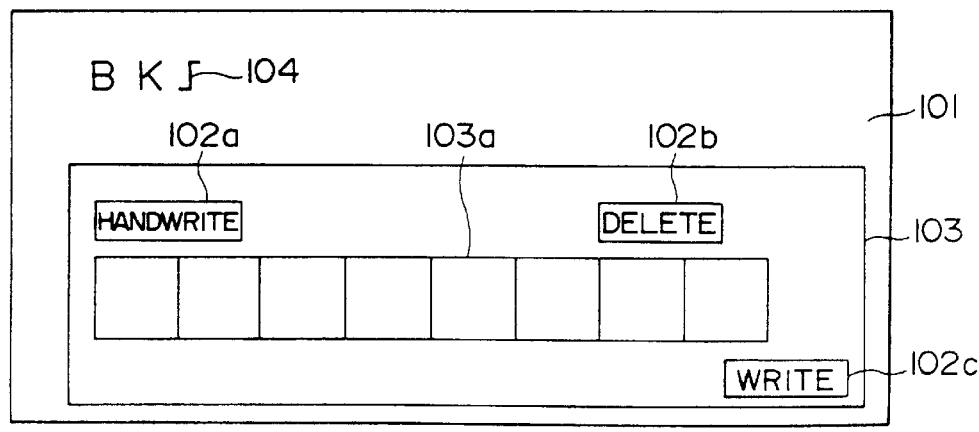
Figure 18A:
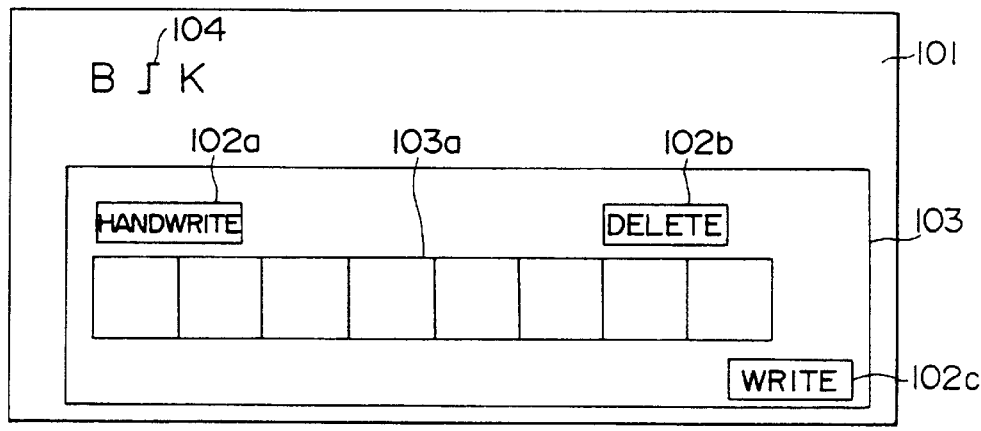
FIG. 18A–18C illustrate exemplary display contents on the screen to explain a known operation for insertion of characters.
Figure 18B:
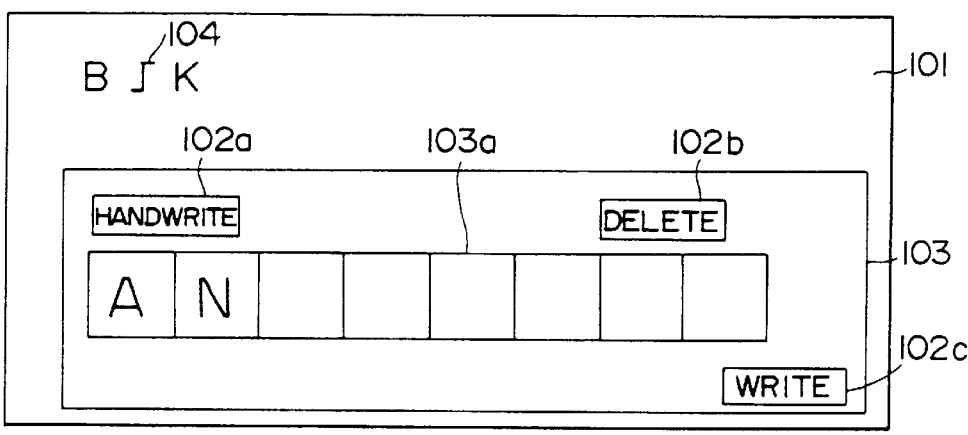
Figure 18C:
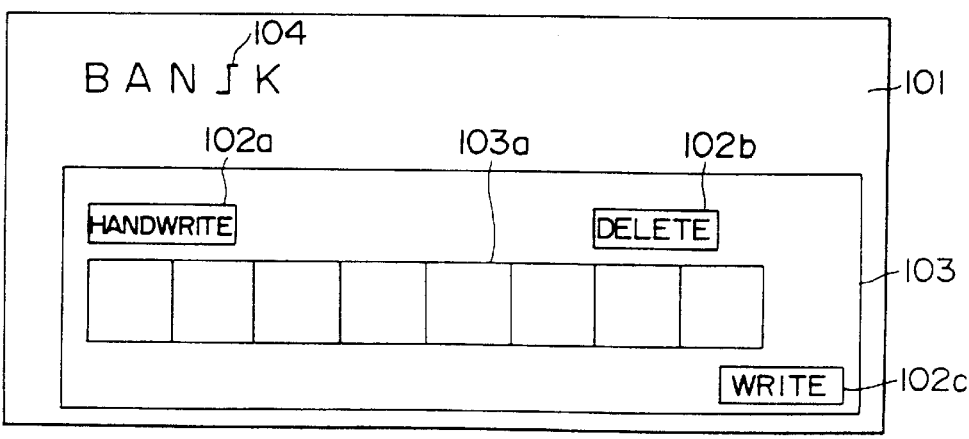

FIG. 10 shows an exemplary case where a pen-down action is performed on the character "B" displayed on the page plate 81, and the pen 6 is dragged to the character "K" spaced apart therefrom rightward by four characters. The pen-dragged characters are reversed to black and are displayed also in the squares 83 on the letter plate 82. In the state of FIG. 10, if any character-displayed square 83 on the letter plate 82 is touched with the pen 6, the character in that square 83 is deleted therefrom as shown in FIG. 11. And when the write button 85 is touched with the pen 6 as shown in FIG. 12, the reverse-image characters displayed on the page plate 81 in FIG. 11 are deleted therefrom (the blank characters displayed in the squares 83 are inserted). Subsequently, if the pen 6 is dragged on the characters "GOOD" in the state of FIG. 13 where the characters "THIS IS A GOOD BOOK" are displayed on the page plate 81, the relevant characters are reversed to black as shown in FIG. 14 while being displayed also in the squares 83. When characters for correction are sequentially written in the squares 83 on the letter plate 82, the characters previously written are deleted therefrom, and then the newly written characters are displayed after being identified by pattern recognition (FIG. 15). In this example, the characters "NEW GOOD" are written in place of the characters "GOOD". When the write button 85 is touched with the pen 6 after the characters for correction have been written, the characters "NEW GOOD" are displayed at the positions of the preceding characters "GOOD", as shown in FIG. 16. And the characters in the squares 83 are deleted therefrom.

In this manner, it is possible to perform deletion, insertion and correction of characters by similar manipulations.

In the above embodiment, if the pen 6 is dragged to the characters displayed on the page plate 81, the operation is switched automatically to an editing mode, and the pen-dragged characters are displayed in the squares 83. And when the write button 85 is touched with the pen 6 in the editing mode, the characters in the squares 83 are displayed on the page plate 81 to thereby terminate the editing mode. Due to the procedure mentioned, it becomes possible to eliminate the necessity of particularly displaying "edit button" on the screen 8, hence realizing effective use of the display area of the screen 8 with another advantage of enhancing the operational efficiency.

In the above constitution where an editing mode button is not provided and the operation is switched to an editing mode in response to a drag of the pen 6 to the character on the page plate 81, the operational efficiency may be deteriorated if the pen 6 is moved to touch the position between desired characters to shift the cursor 84 to such position as in the conventional apparatus. More specifically, in case the pen 6 is brought into touch directly with the character in error instead of touch with the inter-character position, it follows that such action is regarded as a drag to the character instead of a shift of the cursor 84. For the purpose of averting such a fault, it is preferred that the cursor 84 be shiftable to a desired position by first moving the pen 6 down to the cursor 84, then dragging the pen 6 to the desired position, and lifting up the pen 6 therefrom (to drag the cursor). FIG. 8 shows the operating procedure for shifting the cursor in the manner described.

In step S41, a decision is made as to whether a pen-down action has been performed or not. And the operation proceeds to step S42 in response to the absence of a pen-down action for execution of the other process. If the result of the decision signifies the presence of a pen-down action, the operation proceeds to step S43 where a decision is made as to whether the pen-down action is on any character or not. If the result of such decision signifies that the pen-down action is on any character, the operation proceeds to step S44 to select a character editing mode. In case the result of the decision signifies that the pen-down action is not on any character, the operation proceeds to step S45 where a decision is made as to whether the pen-down action is on the cursor 84 or not. And if the pen-down position is neither on any character nor on the cursor, the cursor is jumped to that position (step S46). Thereafter the operation proceeds to step S47 where a decision is made as to whether a pen-up action has been performed or not. If the result of such decision signifies the absence of a pen-up action, the operation proceeds to step S48, so that the cursor is jumped to the position of the fore end of the pen and is displayed thereat. In case the pen-down position is on the cursor, the operation proceeds from step S45 to step S47, where the cursor 84 can be shifted to the desired position by moving the pen 6 while pressing the same to the page plate 81. And when the pen 6 is lifted up at the desired position, the cursor is displayed with on-off flashing at the pen-up position (step S49).

As described hereinabove, according to the handwritten information input apparatus of the present invention, a character row in the second area is displayed in the first area when the pen is dragged thereon, so that deletion, insertion and correction of the characters can be executed by similar manipulations.

Furthermore, when the pen is dragged on a character row displayed in the second area, the operation is switched to an editing mode. And the editing mode is interrupted in response to a touch of the write button with the pen, thereby eliminating the necessity of additionally providing an editing mode button to consequently realize effective utilization of the screen space while enhancing the operational efficiency.

In addition, the cursor is shifted with a drag of the pen and is jumped to the position of termination of such drag, whereby an edit mode can be selected without the necessity of providing an editing mode button, and the manipulation for jumping the cursor to the desired position can be facilitated.

What is claimed is:

1. A handwritten information input apparatus comprising:
a pen for inputting character information by handwriting;

a tablet traceable by said pen and adapted for detection of the trace information inputted by said pen;

a display unit provided under said tablet for displaying an image visibly through said tablet;

a first area defined on said tablet for inputting the trace information by said pen;

a first area of said display unit superimposed with said first area of said tablet for displaying characters generated by pattern recognition of trace information written in said first area of said tablet;

a second area defined on said display unit for displaying, in response to operation of a control key, characters written in said first area and for erasing, in response to operation of said control key, said characters from said first area of said display unit;

and a controller for displaying a desired character in said first area on said display unit copied from said second area when said pen is dragged on a portion of said tablet corresponding to said desired character displayed in said second area.

2. The handwritten information input apparatus according to claim 1, wherein the first area on said tablet and the second area on said display unit are formed to be different from each other.

3. The handwritten information input apparatus according to claim 1, wherein a letter area is displayed on said display unit correspondingly to said first area as a guide for inputting the trace information.

4. The handwritten information input apparatus according to claim 3, wherein said letter area is displayed in a window region.

5. The handwritten information input apparatus according to claim 3, wherein said desired character is displayed in said letter area.

6. The handwritten information input apparatus according to claim 5, wherein, when said desired character displayed in said letter area is touched by said pen, said desired character is deleted.

7. A handwritten information input apparatus comprising:

a pen for inputting character information by handwriting;

a tablet traceable by said pen and adapted for detection of the trace information inputted by said pen;

a display unit provided under said tablet for displaying an image visibly through said tablet;

a first area defined on said tablet for inputting the trace information by said pen;

a first area of said display unit superimposed with said first area of said tablet for displaying characters generated by pattern recognition of trace information written in said first area of said tablet;

a second area defined on said display unit for displaying, in response to operation of a control key, characters written in said first area and for erasing, in response to operation of said control key, said characters from said first area of said display unit; and a controller for starting an editing mode when said pen is dragged on a portion of said tablet corresponding to said desired character displayed in said second area, and for copying said desired character to said first area of said display unit, and for interrupting the editing mode when said operating key is actuated by said pen.

8. The handwritten information input apparatus according to claim 7, wherein said controller so operates that, when the editing mode is started, said pen-dragged desired character in said second area is posted to and displayed in said first area, whereby said desired character thus posted from said second area is edited in said first area.

9. The handwritten information input apparatus according to claim 8, wherein said editing operation is performed in the window region.

10. A handwritten information input apparatus comprising:

a table traceable by said pen and adapted for detection of the trace information inputted by said pen;

a display unit provided under said tablet for displaying an image visibly through said tablet;

a first area defined on said tablet for inputting the trace information bu said pen;

a first area of said display unit superimposed with said first area of said tablet for displaying characters generated by pattern recognition of trace information written in said first area of said tablet;

a second area defined on said display unit for displaying, in response to operation of a control key, characters written in said first area and for erasing, in response to operation of said control key, said characters from said first area of said display unit;

said first area adapted to display characters copied from said second area; and a controller for displaying a cursor at a desired position in said second area where the character generated in said first area is to be posted, said controller operating in such a manner that, when said pen is dragged on the cursor, said cursor is shifted to a desired position determined by the tip of said pen.

* * * * *